May 16, 1939.  O. K. REINHARDT  2,158,151
DRY CELL
Original Filed May 12, 1932
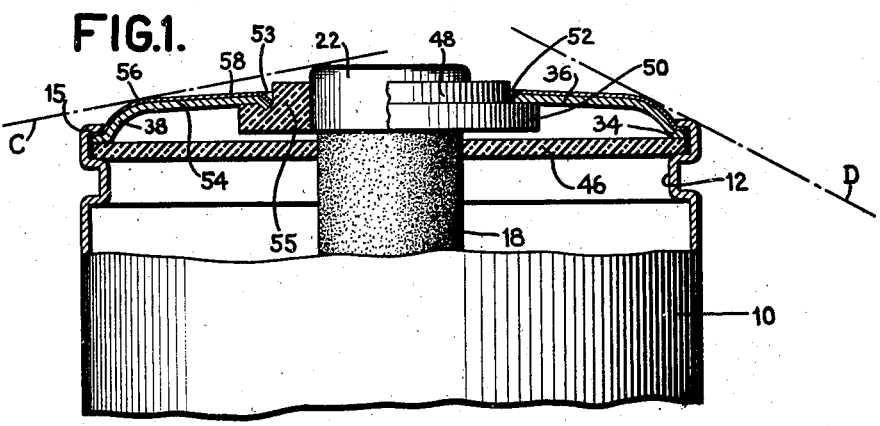
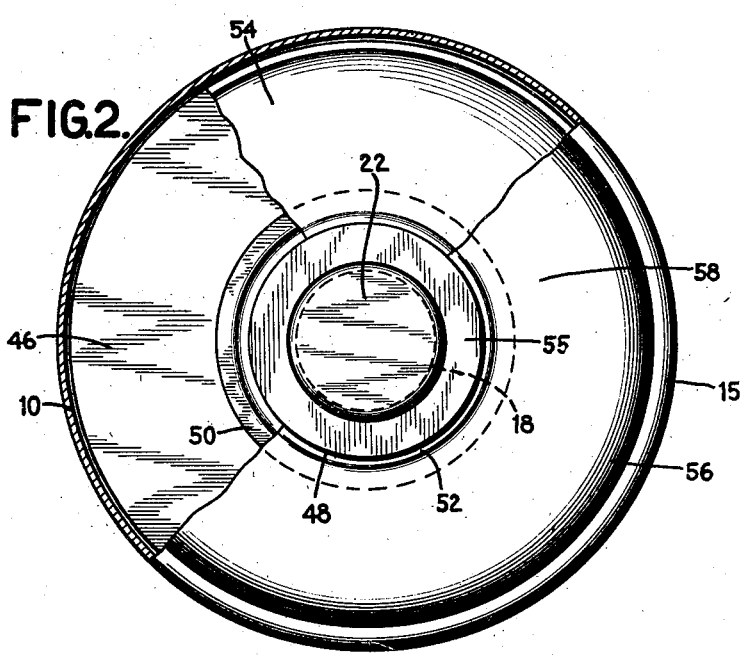
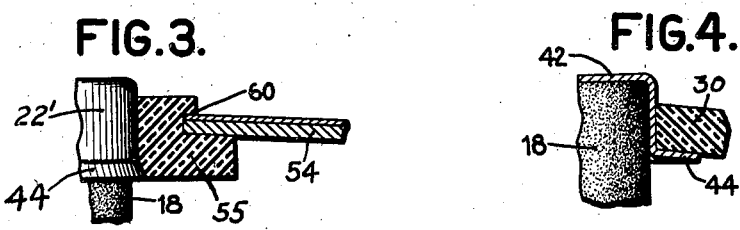
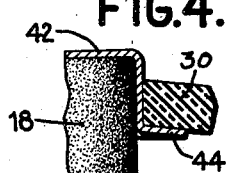
INVENTOR
*OTTO K. REINHARDT*
BY
ATTORNEYS Patented May 16, 1939

2,158,151

UNITED STATES PATENT OFFICE 2,158,151

DRY CELL

Otto K. Reinhardt, Jamaica, N. Y., assignor, by mesne assignments, to Western Cartridge Company, a corporation of Delaware Original application May 12, 1932, Serial No. 610,791. Divided and this application December 23, 1936, Serial No. 117,281

3 Claims. (Cl. 136—133)

This invention relates to dry cells and more particularly to small dry cells such as are used in connection with electric flashlights and hand lanterns, although not so limited.

The invention has for one of its objects a closure for the upper end of the dry cell cup.

Another object of the invention is a closure which shall, when the cells are superimposed one above the other in a flashlight, prevent the conductive bottom of the upper cell bridging the central terminal of the lower cell and its cup to form a short circuit destructive of the cells. Accordingly, the closure is formed with a shoulder, or material of the closure is otherwise so disposed that a straight line tangent to the central terminal and the edge of the cup will pass through the closure. More specifically, a straight line tangent to one terminal and the closure will lie outside of the other terminal of the cell.

It is also an object of the invention to provide an effective seal for the flashlight cell. To this end, a closure portion snugly receives a metal cap for the end of the electrode.

A further object of the invention is to provide a closure for a dry cell which shall offer adequate or additional gas chamber space. Accordingly, the closure is of inverted dish shape or convex and the space beneath the upwardly deflected portion is in communication with the space above the cartridge.

Still another object of the invention is to provide a metallic closure for a dry cell which shall be insulated from the electrode. An insulating washer or bushing surrounds the electrode and supports the metallic closure and the exposed surface of the closure is coated or covered with an insulating layer, such as enamel.

The invention also seeks a dry cell having effective means for preventing either inward or outward displacement of the closure member and at the same time preventing outward displacement of the electrode. To this end, the metallic cap for the electrode is preferably provided at its lower edge with a slight taper or flare or the equivalent on which the closure or bushing rests or which engages the closure or bushing or which wedges tight into the closure or bushing and the periphery of the closure is secured to the edge of the cup as by clamping the same between a bead formed in the cup and the inwardly deflected edge.

Again, the invention has for its object a tight joint between a metallic closure and the bushing, which insulates it from the central electrode. In accordance with this aspect of the invention, the hole in the bushing is slightly smaller than the electrode so that, on assembly, the bushing is caused to expand whereby the edge of the metal closure bites into or is embedded in the bushing.

Yet another object of the invention is the provision of a closure or sealing means for a dry cell which is practical from the standpoint of ease and cheapness of manufacture and convenience, durability and reliability in use.

These and other objects of the invention and the means for their attainment will be more apparent from the following detailed description, taken in connection with the accompanying drawing illustrating various embodiments by which the invention may be realized, and in which:

Figure 1 is a view showing the upper portion of a dry cell, parts being broken away to show details of this invention;

Figure 2 is a view, looking from above in Figure 1, parts being removed to show details;

Figure 3 is a fragmentary enlarged view of one aspect of the invention showing the joint between the bushing around the electrode and a metal closure; and Figure 4 is a fragmentary view showing the joint between a closure portion and the contact cap according to another modification of the invention.

This application is a division of Serial Number 610,791.

The invention is shown as applied to so-called small dry cells of the type commonly employed in connection with electric hand lamps and flashlights, but is applicable in whole or in its several aspects to any dry cell. A metallic cup 10, conveniently of zinc, such as shown in Figure 1, has a groove rolled in the wall to form an inwardly directed bead or shoulder 12 proximate the rim or mouth of the cup 10. In all dry cells, within such a cup, is usually disposed a cartridge formed of a suitable matrix composition conveniently molded about a carbon rod electrode which projects upwardly, as at 18.

After the cartridge has been inserted and, if desired, sealed in the cup, a closure member is applied thereto.

A metallic cap 22, say, of brass, is adapted to be disposed on the upper or protruding end of the carbon electrode, engaging it with a snug fit.

On the bead may rest, if desired, a paper washer or bushing 46 of fiber, paper or other insulating material, which is provided with a central aperture through which the carbon rod passes. In many situations, however, such paper washer will be omitted.

It is very desirable that the joint between the metal cap and the proximate portion of the closure, whether wholly of insulating non-metallic material as shown at 30 in Figure 4 or partly of non-metallic material and partly of metal as shown at 54, 55 in Figure 1, be tight. To this end, the closure portion, either that portion of the non-metallic closure 30 surrounding the aperture or the bushing 55, is of insulating material and is formed with a central aperture less than the diameter of the metal cap, said material being inherently resilient so that when said closure portion and cap are forcibly assembled, the material will expand into sealing contact with said cap. A portion of the closure engages the brass cap with a gas tight joint.

The insulating washer or bushing 55 is formed with a flange 50 on which rests the rim of the central aperture 52 of a convex closure 54 which, in this modification, is of metal. It will be observed that this manner of assembling the closure portions 30 or 55 and cap 22 forms a gas tight seal. Were the closure in engagement with the relatively porous carbon electrode, the escape of gases through the porous carbon around the closure would be permitted, but since the cap is relatively not porous, gases cannot escape.

The closure 30 or 54 rests on the bead 12 or on the fibrous washer 46 thereon and the rim of the cup 10 is spun inwardly as a flange 15 over the periphery 34 of the closure 54 to clamp the same against the bead 12 or on the fibrous washer and hold it firmly in place with a gas tight joint.

The top may be enamelled or otherwise coated with an insulatory material, as at 58, so as to effectively insulate a superimposed cell from the metal of the closure and thus a superimposed cell contacting with the metal central electrode 22 and with the insulatory coating 58 on the metal top is insulated and prevented from contacting with the edge 15 of the cup and becoming short-circuited.

As shown, the closure 54 is convex or inverted dish shaped with its periphery or rim 34 offset from the main or convex portion 36 of the closure in a plane therebeneath. The convex portion 36 may lie in a substantially horizontal plane, as viewed in the drawing, or be somewhat dome shaped, and forming between the main portion 36 and the periphery 34 a shoulder 38, the important feature being that material of the closure is so disposed that a straight line tangent to the cap 22 and edge 15 passes through material of the top, or in other words, so that a straight line tangent to one terminal, say, the cap 22 and the shoulder 38 will pass outside of the other electrode, say, the edge 15. Similarly, a line tangent to the edge 15 and shoulder 38 will pass outside of the cap 22.

By so forming the closure 54, several important advantages are attained. In the first place, by the upwardly offset or convex portion 36, additional space is provided therebeneath for gases generated in the cell in use and thus, if desired, a shorter cell or longer cartridge may be used and yet adequate gas space will be afforded. Also a closure, so shaped, may be availed of to give the cell more capacity, that is, space for active material. Furthermore since the edge 15 of the cup is below the plane including the major portion of the closure, the cup may be of less height, as shown in Figure 1. That is, because there is material displaced into the bead, the height of the cup would have to be greater, were it not for the downwardly deflected periphery of the closure, which permits a shorter cup to be used, in fact, a cup only as high as the usual cup for a dry cell in which no bead or inturned flange is found. As it is, that amount of material is saved which, in quantity production, amounts to a very large saving. Furthermore, the convex or dish shaped top permits the top to encircle the brass cap while still permitting the rim of the cup to be disposed in accordance with standard practice some distance therebelow. Another, and probably the most important advantage attained by the convex top is that the convexity is preferably continued to a point proximate the periphery and is at a point in a horizontal plane above the horizontal plane including the inturned rim of the cup. When, therefore, one cell is superimposed upon another in a flashlight (and these cells generally loosely fit within the flashlight) should the superimposed cell be displaced slightly, that is, should its axis lie at an angle with respect to the axis of the cell upon which it rests, the bottom of the cell will contact with the central electrode and with the non-conducting top but will not touch the rim of the cup to short circuit the cell. The bottom of the superimposed cell is indicated by the broken line C in Figure 1. This is an important advantage because dry cells in flashlights are frequently short-circuited and destroyed and caused to leak by reason of this bridging of the electrode and zinc cup. It will also be noted that should a cell touch the rim, it cannot at the same time touch the central electrode, as shown by the broken line D in Figure 1.

The contact cap 22 of the Figure 1 disclosure may be modified as shown in Figures 3 and 4. The metallic cap 22' or 42 for the central carbon electrode 18 is conveniently formed with a flare or lip 44, which engages against the underside of the closure 30 or the bushing 55. Such a flare or lip would prevent downward pressure of the edge as at 53 forcing the bushing 55 downwardly into the cell. Also, when the closure is clamped in position on the bead 12 by the inwardly spun edge 15 of the cup 10 any tendency of the electrode 18 toward axial movement or outward movement due to internal causes within the cell is prevented by the flange 44, which engages the immovable and inflexible closure portion. This lip 44 may also serve as a stop to limit relative movement in assembly.

If desired, the rim of the hole 52 may be deflected downwardly, as shown at 53, Figure 1, to bite into the fiber washer 55 to increase the effectiveness of the seal at this point.

It is very desirable that the joint between the bushing 55 and the metal closure portion 54 be tight. This may also be conveniently accomplished by having the hole 52 in the metal top slightly smaller in area than the cross-sectional area of the bushing. Then, when the metal closure 54 is forcibly assembled with the bushing and the bushing then forced down over the brass cap, the consequent deformation of the insulating material causes some material to be displaced over the edge of the metal, as shown at 60, in Figure 3, so that the metallic edge is embedded in the material. Thus a very tight joint is obtained.

It will thus be seen that a dry cell has been provided which is easily and cheaply manufactured and provides advantages not found in the prior art.

Various modifications will occur to those skilled in the art in the composition, configuration and disposition of the component elements going to make up the invention as a whole as well as in the several embodiments and in the selection and/or combination of different component elements in a dry cell, and no limitation is intended by the phraseology of the foregoing description or illustrations in the accompanying drawing except as indicated in the appended claims.

What is claimed is:

1. In a dry cell, a metallic cup, a cartridge therein having an upwardly projecting substantially centrally disposed electrode, a metallic cap over the end of the electrode, a bushing of insulating material formed with a central aperture receiving the metallic cap, said bushing comprising a main portion and a peripheral flange extending outwardly from the lower portion thereof, a metallic closure resting on the flange of the bushing and having a central opening of a diameter less than the initial diameter of the main portion of the bushing, said insulating material having inherent resiliency so that when said bushing is inserted in said closure aperture it is snugly received therein.

2. In a dry cell, a metallic cup, a cartridge therein having an upwardly projecting substantially centrally disposed electrode, a metallic cap on the end of the electrode, a bushing of insulating material formed with a central aperture receiving the metallic cup, said bushing comprising a main portion and a peripheral flange extending outwardly from the lower portion thereof, a metallic closure secured to the upper edge of the cup and having a portion resting on the flange of the bushing, said metallic closure having a central opening of less diameter than the initial diameter of the main portion of the bushing, the insulating material of said bushing having inherent resiliency so that when the bushing is inserted in the closure aperture of the metallic closure it is snugly received therein.

3. In a dry cell, a metallic cup, a cartridge therein having an upwardly projecting substantially centrally disposed electrode, a metallic cap on the end of the electrode, a bushing of insulating material formed with a central aperture receiving the metallic cap, said bushing having an upper portion and a lower portion of greater diameter than the upper portion forming a peripheral flange, and a metallic closure plate secured to the edge of the cup and resting on said flange, the closure plate having a central opening of less diameter than the initial diameter of the upper portion of the bushing whereby the edge of the opening in the closure plate is imbedded in the material of the bushing.

OTTO K. REINHARDT.